Patented Sept. 24, 1968

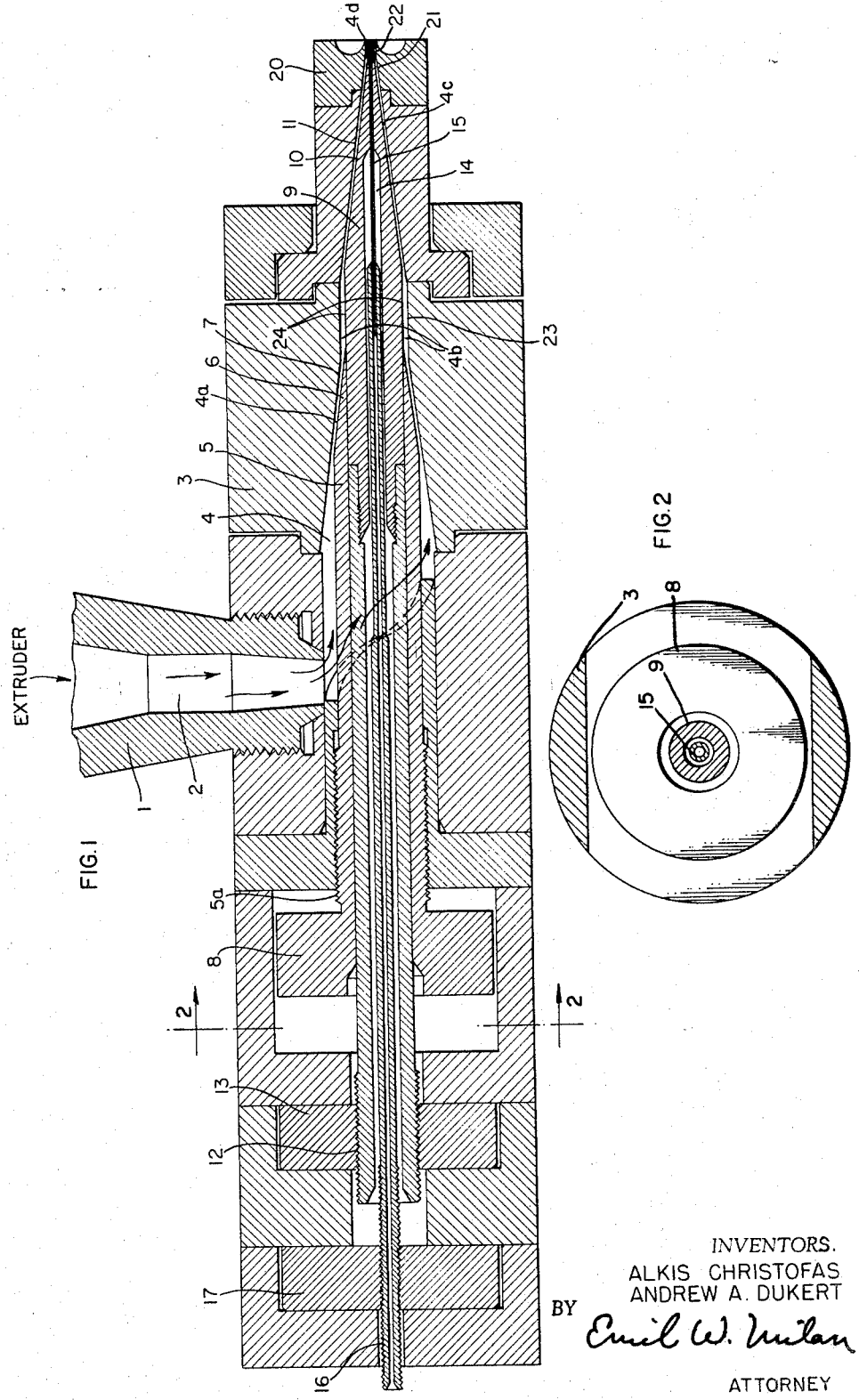

1

3,402,427
APPARATUS FOR EXTRUDING PLASTICS
Alkis Christofas, Philadelphia, and Andrew A. Dukert, Ambler, Pa., assignors to Pennsalt Chemicals Corporation, Philadelphia, Pa., a corporation of Pennsylvania
Filed Oct. 30, 1964, Ser. No. 407,684
8 Claims. (Cl. 18—13)

ABSTRACT OF THE DISCLOSURE

A crosshead die body apparatus including a shaping die for extruding and shaping thermoplastic material, wherein the crosshead die body has at least two externally adjustable internally axially positioned frusto-conically shaped valving means and at least one annular orifice portion of fixed uniform annular width and of substantially fixed but adjustably variable length located axially between said valving means, the valving means and annular orifice each being located about the same axis and ahead of the fixed size shaping die inlet, whereby the pressure drop and shearing stress between the extruder outlet and the shaping die may be progressively and precisely controlled.

This invention relates to the shaping by extrusion of thermoplastic material comprising polyvinylidene fluoride. More particularly, it relates to an improved process for extruding polyvinylidene fluoride resin at an increased rate of throughput while maintaining the extrudate substantially free from surface flaws and body defects. Still more particularly, it relates to an improved crosshead die which is advantageously used for the practice of this improved process.

Polyvinylidene fluoride is a fluorine-containing thermoplastic resin which is relatively new in commerce. It is a crystalline, high molecular weight polymer of vinylidene fluoride. It is flexible in thin sections, but is rigid and capable of load bearing in thick sections. It possesses high impact, tensile and compression strengths and has a low level of creep. The resin melts at about 340° F. It is thermally stable for periods of about one-half hour at about 500° F. without exhibiting significant dehydrofluorination or chain scission. However, thereafter, degradation slowly occurs and becomes rapid particularly at temperatures of about 600° F.

Polyvinylidene fluoride resin can be extruded into various forms, e.g. shapes, rods, tubing, wire coating and cable jackets, by using known extruding means. However, the rate of output of extrudate obtained by use of such means is uneconomically slow by modern standards. One object of this invention is to obtain increased extrusion output rates while maintaining optimum quality characteristics in the extrudate.

A conventional extruding means for thermoplastic materials usually consists of an extruder, an adaptor and a die body including a forming die, assembled in tandem. In extruding polyvinylidene fluoride resin by such means, no particular difficulty is encountered while fluidizing the resin by means of elevated temperatures and pressures in the extruder. However, in passing from the extruder and through and out of the adaptor to the die body and into the shaping die, polyvinylidene fluoride resin becomes vulnerable to degradation by heat in the adaptor and in the die body, and to surface, body and dimensional defects as it passes through the shaping die.

Thermal degradation of the resin occurs particularly in the adaptor and die body wherever recesses are present in which bulky and stagnant masses of the resin can collect and be subjected to high pressures and elevated temperatures for prolonged periods of time, e.g. for more than about one-half hour at 500° F. or over. Therefore, such recesses must be avoided in the die body.

Also, in passing through the die, polyvinylidene fluoride resin is susceptible to melt fracture whenever the shearing stress imposed on the resin by the pressure from the screw of the extruder during forming exceeds the yield point for the resin. As a result, especially when high molecular weight polyvinylidene fluoride is extruded, the extrudate may form in discontinuous, tubed or rippled sections. At lower shearing stresses and at high speeds of extrusion, even with resins of moderate molecular weight, the surface of the extrudate may be made rough or sandy in appearance, or may be torn as it passes through the shaping die, as a result of uncontrolled variations in pressure and temperature. Accordingly, shearing stresses must be kept at a minimum.

Furthermore, as often occurs with other thermoplastic materials, shaping of polyvinylidene fluoride resin through a shaping die is affected by certain known die design and operating condition variables. These variables include the diameter of the die land, the length of the die land, and the temperature of the die during extrusion. The die land diameter determines the diameter of the extrudate within limits. The length of the die land affects the surface smoothness of the extrudate. Generally, the longer the die land, the smoother the extrudate surface.

Precise temperature control is necessary in the die body in order to properly control the melt delivered to the shaping die. Also, the flow rate of the melted polyvinylidene fluoride resin through the shaping die is limited by the occurrence of melt fracture above a critical shearing stress. As is known, increasing the head pressure in an extruder will increase the rate of flow of the resin through a fixed size shaping die. In using a die opening of fixed size and of a constant head pressure, the output flow of a resin through the die will tend to decrease if the viscosity of the melt being handled increases. However, as the viscosity of the melt increases, the extruder will simultaneously develop increased head pressure, tending to increase the flow rate. The net result is that the flow rate through the forming die will remain essentially unchanged. As viscosity increases, the power required by the screw of the extruder also increases. The increased power is converted into heat and causes the melt temperature to rise. Consequently, as the combined result of these variables, during extrusion of polyvinylidene fluoride resin, overheating can occur and cause degradation of the resin in the adaptor and die body.

Largely because of the above problems, the characteristics of the extrudate and the output rate of the shaping die are subject to variations whenever the viscosity characteristics of the melted resin change due to a change in temperature, pressure or shearing stress in the die.

In view of all the variables involved, the design, building and operation of expressing dies for the extrusion of polyvinylidene fluoride resin to a particular required shape at an optimum output rate while maintaining optimum quality characteristics and tolerances require a high degree of skill and ingenuity. Furthermore, high costs are involved when a change needs to be made in the form or dimensions of the extrudate. Particularly is this so where more than one form or size of extrudate is to be made with the same extruder, and where the polyvinylidene fluoride resin may be of a different grade or molecular weight from that of a preceding extrusion run.

This invention provides an apparatus and method for overcoming the problems recited above and unexpectedly results in an increased rate of output of high quality extrudate of thermoplastic resin, particularly of polyvinylidene fluoride. Specifically, it provides for a greatly refined control of pressure and shearing stress and thereby of the temperature within the body of the crosshead die and the shaping die sections of the extruding means, which in turn results in better temperature uniformity and quality control of the extrudate. The invention provides for continuous and precise variation and adjustment of the pressure and shearing stresses in the die under actual operating conditions during extrusion and shaping of the polyvinylidene fluoride resin through any shape of extrusion shaping die outlet, especially including, but not being limited to, the outlet of a rod-forming die, of a wire-coating die, of a tube-forming die, of a solid profile-forming die of any shape, and of a multiple-extrusion form of die.

A preferred embodiment of the invention, in the form of an apparatus, simultaneously provides for continuous and precise variation and adjustment of the internal dimensions of the orifice within the die body and within the shaping die under actual operating conditions during the continuous extrusion and shaping of the resin.

The method of this invention comprises adjusting the dimensions of the orifice of an internally tapered die body having a plurality of alternating cylindrical and frusto-conical cavities internally disposed concentrically about the axis of said body and having a plurality of frusto-conically shaped valving means each complementary in shape to a corresponding frusto-conically cavitied section and each disposed concentrically about the axis of said body adjacent to said frusto-conically cavitied sections by moving at least one of said valving means in an axial direction to vary the distance between the exterior of the valving means and the surface of the frusto-conically cavitied section, while continuously extruding polyvinylidene fluoride resin through the outlet of a shaping die attached to the outlet of said die body. By manipulation of the frusto-conical valving means, the pressure drop and shearing stress between the extruder outlet and the shaping, or forming, die outlet are progressively and precisely altered and controlled.

The invention will be better understood by reading the following detailed description of the process and apparatus of this invention with reference to the drawings in which there is illustrated in FIG. 1 an embodiment of a crosshead die according to the invention, shown in a sectional elevation view taken substantially through the center. FIG. 2 is a cross-sectional view of the apparatus taken at 2—2.

In FIG. 1, the discharge end of an extruder cylinder, not shown, discharges into an adaptor 1 provided with a resin passage 2. The adaptor 1 is connected at its discharge end with a crosshead die body 3. The passage 2 connects with an annular die body orifice 4 (parts of which are also designated as 4a, 4b, 4c and 4d for ease of description) passing transversely through the die body. Within the orifice 4 is positioned a first valving means, or mandrel, 5 provided with a frusto-conically shaped tapered end 6 which seats against the die body 3 in a congruous frusto-conical seat 7. The valving means 5 is threaded at its rearward end 5a to fit sealably and to rotate adjustably within the die body 3. An external portion of the valving means 5 is provided with an adjusting knob 8 for rotating the valving means 5 and moving its tapered end 6 toward or away from the seat 7. A second valving means, or mandrel, 9 is slidably and sealably located axially within the first valving means 5. The second valving means 9 is also provided with a frusto-conically shaped tapered end 10 which is located at the forward end of the second valving means 9 and is arranged to seat against a congruous second frusto-conical seat 11 in the die body 3. The valving means 9 is centered and supported within the die body by the inner wall of valving means 5 and by a threaded portion 12. An external adjusting knob 13 is attached to the valving means 9 at its rearward end for adjusting the tapered end 10 toward or away from seat 11. The knob 13 is rotatably fitted in a recess in the die body 3 to which access is provided through openings in the die body 3 for turning the knob 13.

A cylindrical opening 14 concentric to the axis of the die body 3, extends axially through the second valving means 9. A third valving means, or mandrel, 15, in the form of a hollow shaft, through which can be sealably fitted a rod for tube drawing or a hollow tube wire guide for wire drawing, is located axially within the opening 14. The rearward end of the third valving means 15 is centered and supported by a threaded section 16 at the rear of the die body 3. The forward end of the third valving means 15 is supported at its forward end by the inner wall of the valving means 9. The third valving means 15 is provided with an adjusting knob 17, threaded at its center to rotate around the third valving means 15, and movably and accessibly fitted in the die body 3 for adjusting the third valving means 15 toward or away from the end of the opening 14.

A shaping die 20 is removably attached at the forward end of the die body 3. Within the shaping die 20 is located a frusto-conical cavity 21 which is concentric and congruous with tapered end 10 and which merges at its rearward end into seat 11 as a substantial extension thereof. At the forward end of cavity 21 is located a cylindrical land 22 which is concentric with the forward end of the third valving means 15. The third valving means 15 is arranged to be rotated and adjustably moved toward or away from the land 22 in an axial direction, with the outer edge of the forward end of the straight portion of the means 15 seating against the interior of the extrudate during extrusion of the resin through the forming die.

In the forward end of the die body 3 is located a cylindrical cavity 23 which with a cylindrical portion 24 of the second valving means 9 forms a cylindrical annular cavity 4b of fixed cross-sectional area and width. The length of the annular cavity 4b is somewhat variable, e.g. ranging from about 0.75″ to 3″, and dependent on the distance between the forward end of the tapered end 6 and the rearward end of the tapered end 10 as the tapered ends are adjusted toward or away from their respective congruous seating cones 7 and 11. The width of the annular 4b should be at least as wide as the width of the annulus between tapered end 6 and seat 7 at the midpoint setting of tapered end 6, e.g. about 0.02″ to 0.1″ when tapered end 6 measures about 1.5″ O.D. at its base.

The cylindrical annular space 4b serves primarily as a reservoir for polyvinylidene fluoride prior to entry of the resin into the frusto-conical annular space 4c between the tapered end 10 and seat 11. However, the annular space 4b also serves as a space in which the resin relaxes after passing through the deformation stresses in the frusto-conical annular space 4a between the tapered end 6 and seat 7. The overall effect thus produced within the die body is that the shearing stresses are interrupted about midway in the extrusion operation and the resin is relieved of stress temporarily before stress is again applied in the next frusto-conical section. The quality of the extrudate is improved thereby and the throughput rate of extrudate increased.

The angle of the tapered end 6 and its congruous seat 7 and the angle of the tapered end 10 and its congruous seat 11 each can range from about 10° to 30° measured from the axis. The angle of the tapered end 6 and its seat 7 preferably is from about 20° to 30°. The angle of the tapered end 10 and its seat 11 is preferably from 10° to 20°. An angle at the smaller end of the range is preferred when one desires to express thin-walled tubing and for wire coating extrusions. The clearances and relationships between the end of the third valving means 15, the tapered end 10 of the second valving means 9, and the cavity of the shaping die 20 as used in wire coating are critical for optimum characteristics of the extrudate. Also critical are the shape and size of the orifice 4 between the tip of the third valving means 15 and the straight tubular forming bore of the shaping die 20, especially at the point where the resin enters the straight tubular section for final forming, i.e. at the straight land 22 of the forming die 20. When the cross-sectional width of the orifice 4 and the distance which the end of the third valving means 15 projects beyond the end of the second valving means 9 and into the forming die 20 are properly set, the relative velocity of the resin being extruded and of the wire are correctly proportioned. The extrudate then is free from melt fracture or other defects and is extruded to proper dimensions and optimum quality with the required adhesion on the wire. However, misadjustment of the above relationships can cause excessive shearing stress and melt fracture, especially at the entrance to the straight land 22 of the shaping die 20. The extruded mass of molten resin also can break as it is drawn down on the relatively faster moving wire, causing a rough or discontinous coating or numerous other coating flaws.

Another factor which must be considered is that if the wire guide tip of the third valving means 15 extends improperly into or beyond the die land 21, the coating on the wire may be deposited loosely in folds or in ripples. Similarly in shaping of tubing, the position of the tip of the third valving means 15 in the form of a rod used with reference to the die land 22 has a considerable effect on the thickness of the extruded tubing and its diameter. Proper positioning of the tip during actual operation as provided by this invention overcomes these difficulties.

The die body 3 is preferably made up of sections which can be readily machined and assembled to make the completed crosshead die body. By providing a variety of first and second valving means having different tapers, and a variety of sections having corresponding congruous seating portions, a variety of sizes of tubing and rod can be extruded by using the same main die body parts and by merely changing the valving means and shaping die as necessary. In each assembly, the advantages of this invention will be obtained.

In practice of the invention, polyvinylidene fluoride resin is fluidized and brought to extrusion temperature by applying pressure and heat to the resin in an extruding device capable of operating at pressures of several tons, e.g. 5 to 15 tons, and at temperatures of at least 500° F., e.g. 500° to 1000° F. The fluidized resin is then forced through adapter 2 into die body 3 and is there maintained below the extrusion temperature of the resin, e.g. 400° to 700° F., by means of external heating. The width of the annular orifice 4 of the die body is progressively varied in stages to create a progressive adjustment in pressure and shearing stress on the resin as it passes between the inlet and the outlet of orifice 4. The resin is then extruded from the outlet 4d of orifice 4 through shaping die 20, which is continuously heated at a forming temperature, of about 750° to 850° F. The extruded resin is finally cooled below its setting temperature and to room temperature by the usual means as it leaves the shaping die 20.

In general, the method consists of four steps which in combination affect the characteristics of the extrudate and the output rate of the forming die. In the first step, the pressure in the die body 3 is reduced from that of the extruder down to about the pressure necessary to extrude the resin through the shaping die 20 by mechanically varying in a gross adjustment the size of the annular orifice 4 at 4a in a first portion of the die body by manipulation of valving means 5. In the second step, the shearing stress on the resin is minimized by passing the resin through the cylindrical annular cavity 4b in a second portion of the die body where the resin relaxes. In the third step, the shearing stress is permitted to build up in orifice 4 at 4c while the temperature of the resin in the die around valving means 9 is raised to approach the extrusion temperature of the resin in the shaping die 20, and the pressure on the resin in orifice 4 at 4c is more closely adjusted by manipulation of valving means 9. In the last step, the dimensions of the orifice 4 at 4d at the entrance to and within the shaping die 20 are altered by mechanically varying the annular orifice 4 at 4d at the outlet of the die by retracting or advancing the tip of valving means 15. The shaping die 20 is held at extrusion temperature by externally applied heat, preferably from electrical resistance heaters.

Each of the mechanical variations in the annular orifice sizes 4–4d preferably are made during actual operation of the expressing die to obtain the optimum characteristics in the extrudate. In a most preferred embodiment of the invention, the annular orifice 4 is mechanically varied by adjusting the valving means as hereinafter more fully described. Thus, if more pressure is required, the first valving means 5 is retracted to permit more resin to flow into the orifice 4a. The second valving means 9 then can be adjusted to compensate for any change in shearing stress or pressure at 4d. The third valving means 15 next can be adjusted to maintain precise control of the cross-sectional dimensions of the extrudate and its surface quality.

During start-up of the practice of the process of the invention, the surface and body characteristics of the extrudate are observed by the operator of the machine and are modified by him by manipulation of the valving means 5, 9 and 15 until the optimum extrudate characteristics are obtained. Then, by continued observation and manipulation of the valving means 5, 9 and 15, either by manual or automatic control, the optimum characteristics can be maintained by the operator throughout the extruding and shaping operation without reaching or exceeding the yield point of the resin, and regardless of variations in feed resin characteristics.

In a preferred embodiment of the process of the invention, polyvinylidene fluoride resin in the form of pellets is charged into the hopper of an extruder where it is heated above the conversion temperature of the resin, i.e. above about 320° F., preferably to about 400° F., by applying pressure of about 8,000 p.s.i.g. by means of the extrusion screw and by applying heat by external means such as electrical strip heaters. The polyvinylidene fluoride resin is compacted and fluidized within the screw and is discharged into the adaptor 1 through the passage 2 passing into the orifice 4 within the die body 3. The first valving means 5 is initially set with its tapered end 6 seated against seat 7 of the die body 3. Also, the second valving means 9 is initially adjusted with its tapered end 10 seated against seat 11 of the die body. The third valving means 15 is initially adjusted so that its forward tip (either a rod or a tube as the case may be) projects beyond the end of the land 22. The die body 3 is provided with electrical resistance heaters which maintain the temperature of the expressing die at the seat of the first valving means 7 and at the seat of the second valving means 11 at a temperature in the range between 400° and 570° F. A similar resistance heater maintains the temperature of the shaping die 20 in the range between 400° and 800° F.

With the temperatures at the first and second valving means seats, 7 and 11, preferably set at 525°±25° F. and the temperature at the extrusion land 22 preferably set at 750°±50° F. the extrusion is ready to begin.

The invention further will be described as it is carried out in the process of coating a communication wire with polyvinylidene fluoride resin. The wire to be coated is threaded through the third valving means 15 (in this example fitted with a hollow tube wire guide). The wire is projected beyond the land 22 and is attached to an automatic windup device under appropriate tension. The knob 8 is now backed off to unseat tapered end 6 from seat 7. Polyvinylidene fluoride resin flows through the inlet of orifice 4 and accumulates in the annular space 4a ahead of the second valving means 9. Knob 13 is now turned to retract valving means 9, creating an extension of orifice 4–4a to 4b between the tapered end 10 and seat 11. The resin now flows through the orifice 4c between the tapered end 10 and seat 11 and around the outer surface of the tube of the third valving means 15 and out through orifice 4d. Draw-up of the wire which is to be coated is begun, and as the polyvinylidene fluoride resin flows around the tip of the tube of the third valving means 15 and through orifice 4d, the resin deposits on the wire at the outer edge of the outlet of the forming die 20. The coated wire is then air-cooled and water chilled in accordance with the usual practices for handling extruded thermal plastic materials.

Refining adjustment of the third valving means 15, of the second valving means 9, and of the first valving means 5 is now carried out. The volume and pressure of resin being delivered from the adaptor 2 into the orifice 4–4a is regulated by the first valving means 5 so that a constant and sufficient supply of resin at a pressure of about 8000 p.s.i.g. is delivered to the shaping, or forming, die 20. The second valving means 9 is now adjusted by moving the valving means 9 forward or backward until the rate of deformation and the shearing stress near the outlet of the forming die 20 at orifice 4d is at a minimum. This result can be determined by inspection of the characteristics of the extrudate, which should be smooth and free from blemishes. Next, the third valving means 15 is adjusted by moving it backward or forward until the deposit of polyvinylidene fluoride resin on the wire is optimum both as to appearance and tightness of adhesion. These series of adjustments may be repeated if necessary until the rate of extrusion is at an optimum rate consistent with optimum extrudate quality.

While the invention has been described in connection with a wire coating operation, it is to be understood that the invention may also be similarly practiced in the drawing extrusion of tubing, by substituting for the tube of the third valving means 15 a rod of the same external dimensions which rod can be similarly adjusted forward or backward into the land area 22 to obtain the optimum relationship for the proper thickness of the tubing. The invention is particularly valuable in that once the pressure, volume and shear and deformation rates have been set by adjusting the first and second valving means, the characteristics of the extrudate can be readily adjusted and controlled merely by adjusting the third valving means 15. The crosshead die of this invention can also be used to extrude rod shaped extrudate by plugging the outlet of the third valving means so that it does not project into orifice 4d as is known in the art.

Although the method and apparatus of this invention are especially advantageous for the extrusion of polyvinylidene fluoride resin, the method and apparatus can also advantageously be used in the extrusion of other thermoplastic resins. Examples of such resins are the following polymers and their copolymers with known polymeric materials: polyvinyl chloride, polyethylene, polypropylene, toughened polystyrene, nylon, polymethyl methacrylate, polycarbonates, polytetrafluoroethylene and cellulose derivatives, e.g. cellulose acetate.

The advantages of the crosshead die of this invention further are shown by comparing the data of Table I—Standard Type Crosshead Die with that of Table II—Controlled Valving Crosshead Die. The data in Table II were obtained with a crosshead die of this invention.

In the runs 1–5 of Table I and runs 1–6 of Table II, the die tip temperature was maintained at 800° F. Also, the mandrel tip angle (corresponding to the frusto-conical portion 10 in the drawing) was maintained at 14°. In the tables, the item "valve opening" refers to an opening corresponding to orifice 4a in the drawing; and the item "annulus" corresponds to orifice 4b in the drawing. The "valve opening" and "annulus" are not present in the standard type crosshead die of Table I.

In each table, the term "mandrel opening" corresponds to orifice 4c in the drawing. In the runs in each table, computer wire having an outer diameter of 0.020" was coated with a 0.020" thick layer of polyvinylidene fluoride, giving the coated wire an intended outer diameter of 0.040". The extruder pressure was held at 6500–7000 p.s.i.g. in each run except run No. 2 of Table II.

The coated wire from each run was evaluated for surface appearance, coating adhesion and quality. Coating adhesion was evaluated after a soldering test was made on the coated wire from each run.

The results in Table I show that in none of the runs 1–5 was any of the coated wire of specification grade. Appearance varied from "sandpaper" to "smooth." Quality rating was mostly "poor." Output at 3 r.p.m. extruder speed was 50–90 feet per minute.

In Table II, the surface appearance is shown to be uniformly smooth. The coating adhesion is uniformly of specification grade and quality is rated as "good" to "excellent." Moreover, at 3 r.p.m. extruder speed the output ranged from 90 to 120 feet per minute. More significantly, however, it is shown that the r.p.m. was increased to 6 r.p.m., with the output rate being increased to as high as 280 feet per minute with specification grade product being obtained.

Practice of this invention not only overcomes the uncertainties of the usual shaping operation, producing extrudate with the desired optimum dimensional, surface and body characteristics but also, unexpectedly, permits the shaping to be carried out at a rate of output much greater than that formerly possible. We recognize that the use of streamlined flow and of a throttling plug valve,

TABLE I.—STANDARD TYPE CROSSHEAD DIE

| Run Number | 1 | 2 | 3 | 4 | 5 |
|---|---|---|---|---|---|
| Die tip temp | 800° F | 800° F | 800° F | 800° F | 800° F. |
| Mandrel tip angle | 14° | 14° | 14° | 14° | 14°. |
| Valve opening, inch | | | | | |
| Annulus, width x length, inch | | | | | |
| Mandrel opening, inch | 0.125 | 0.070 | 0.125 | 0.125 | 0.250. |
| Extruder, r.p.m | 3 | 3 | 3 | 3 | 3. |
| Extruder pressure, p.s.i.g. at adaptor entrance | 6,500–7,000 | 6,500–7,000 | 6,500–7,000 | 6,500–7,000 | 6,500–7,000. |
| Output, ft./min | 60 | 50 | 50 | 40 | 90. |
| Wire, O.D., inch | 0.020 | 0.020 | 0.020 | 0.020 | 0.020. |
| Coating, O.D., inch | 0.042 | 0.042 | 0.040 | 0.040 | 0.040. |
| Surface appearance | Sandpaper | Tubed, surges | Rough | Smooth | Rough. |
| Coating adhesion | Loose, does not meet specifications for computer wire. | Loose, off-center, off-spec. | Loose, off spec | Loose, off spec | Loose, off spec. |
| Quality rating | Poor | Poor | Poor | Fair | Poor. |

TABLE II.—CONTROLLED VALVING CROSSHEAD DIE

| Run Number | 1 | 2 | 3 | 4 | 5 | 6 |
|---|---|---|---|---|---|---|
| Die tip temp | 800° F | 800° F | 800° F | 800° F | 800° F | 800° F. |
| Mandrel tip angle | 14° | 14° | 14° | 14° | 14° | 14°. |
| Valve opening, inch | 0.024 | 0.032 | 0.032 | 0.024 | 0.032 | 0.024. |
| Annulus, width x length, inch | 0.06 x 1 | 0.06 x 1 | 0.06 x 1 | 0.06 x 1 | 0.06 x 1 | 0.06 x 1. |
| Mandrel opening, inch | 0.024 | 0.032 | 0.040 | 0.045 | 0.032 | 0.045. |
| Extruder, r.p.m | 3 | 3 | 3 | 3 | 6 | 6. |
| Extruder pressure, p.s.i.g. at adaptor entrance | 7,000 | 5,500 | 6,500 | 6,500 | 6,500 | 6,500. |
| Output, ft./min | 90 | 120 | 120 | 120 | 240 | 280. |
| Wire, O.D., inch | 0.020 | 0.020 | 0.020 | 0.020 | 0.020 | 0.020. |
| Coating, O.D., inch | 0.040 | 0.040 | 0.040 | 0.040 | 0.040 | 0.040. |
| Surface appearance | Smooth | Smooth | Smooth | Smooth | Smooth | Smooth. |
| Coating adhesion | Excellent, passes spec. for computer wire. | Excellent, passes spec. | Excellent, passes spec. | Excellent, passes spec. | Good, passes spec. | Good, passes spec. |
| Quality rating | Good | Good | Good | Excellent | Good | Good. | needle valve or gate valve for pressure control within the adaptor portion of an expressing die is known in the art. See, for example, Bernhardt, "Processing of Thermoplastic Materials," Reinhold Publishing Corporation, New York (1950), pages 247–248. Other methods of pressure control are described in Modern Plastics, volume 30, Number 1A (Encyclopedia Edition for 1961), page 720. These include the movable screw method and a seatless needle-plug valve. However, the purpose and use of such valves is to increase the back pressure at the head of the extruder, thereby to increase the amount of working that the resin receives in the screw of the extruder and is not for the purpose of the present invention, which is to control the pressure within the die body itself.

While the combination of a movable screw in the extruder with streamlining in the adaptor portion of an expressing die in effect achieves control of pressure at the head of the extruder and control of volume of resin going to the die body, such a combination is undesirable for extrusion of polyvinylidene fluoride resin because of the relative inflexibility of the combination. In contrast to the crosshead die of this invention, the valving features in the prior art crosshead dies in effect have to be built into the entire extruder. Such design permits very little adjustment of the pressures in and during the extrusion operation. Furthermore, during operation of the extruder with the known crosshead dies, the moving screw has to overcome the tremendous shear of the entire length of the barrel filled with the highly compressed polyvinylidene fluoride melt.

The disadvantages of the use of a plug or seatless or needle valve in the adaptor section are mainly that streamlined flow cannot be attained in all positions of the valve and the valve serves mainly to control the volume and pressure of the resin going to the die body without overcoming the problems of shear in the die body itself while extruding polyvinylidene fluoride resin.

It is to be understood that changes and modifications of this invention can be made by those skilled in the art without departing from the spirit and scope of our invention, and it is our intention to include such changes and modifications in our invention.

We claim:

1. A crosshead die body including a shaping die having an opening of fixed size for extruding and shaping thermoplastic material, said crosshead die body being characterized by having at least two externally adjustable, internally axially positioned frusto-conically shaped valving means and at least one annular orifice portion of fixed uniform annular width and of substantially fixed but adjustably variable length located axially between said valving means, said valving means and annular orifice each being located about the same axis substantially at right angles to the inlet to said die body and ahead of the shaping die inlet.

2. A crosshead die according to claim 1 in which an opening is provided along the axis for passing internally through said valving means and annular orifice a rod shaped material to be coated.

3. A crosshead die including a shaping die having an opening of fixed size for extruding and shaping thermoplastic material under workable conditions comprising
   (a) an elongated hollow body,
   (b) means associated with said body to receive said material from an extruder outlet and to pass it into said body,
   (c) a first mandrel positioned concentric to the axis of said body within said body, said mandrel having at its forward end a frusto-conical shape congruent to a first frusto-conical inner surface of said body near the outlet end of the body and having an elongated cylindrical shape rearward of said frusto-conical forward end, said mandrel being slidably positioned and adapted to said body to move along the axis of the body when actuated by forces applied along the rearward end of said mandrel, and
   (d) a second mandrel positioned concentric to the axis of said body within said body, said mandrel being concentrically and slidably fitted over the cylindrical portion of said first mandrel and having at its forward end a frusto-conical shape congruent to a second frusto-conical inner surface of said body formed rearward of said first frusto-conical surface said second mandrel being slidably positioned to move over said first mandrel along the axis of the body when actuated by forces applied along the rearward end of said mandrel and wherein the forward edge of said second frusto-conical surface of said body is essentially separated from the rearward edge of said first frusto-conical surface by an elongated substantially cylindrical surface.

4. A crosshead die according to claim 3 having means provided in said first mandrel for passing a hollow tube slidably and sealably through said mandrel concentric to the axis of the body and into an adjustable position relative to the outet of the shaping die at the outlet of said body.

5. A crosshead die as described in claim 3 including means for heating the body to workable conditions for extruding and shaping a thermoplastic material.

6. A crosshead die as described in claim 3 including means for adjusting the axial position of the frusto-conical surfaces of the mandrels relative to the frusto-conical surfaces of the body during the extrusion and shaping of the thermoplastic material.

7. In a die body including a shaping die having an opening of fixed size for extruding thermoplastic material, the body having an inlet for thermoplastic material and an outlet for thermoplastic material, passage means connecting the inlet and the outlet, the passage means including a least two coaxial annular frusto-conical passage sections of overall radial dimension tapering toward the outlet, the improvement of a cylindrical annular passage section coaxial with the annular frusto-conical passage sections, disposed between them and connecting them, whereby shearing stresses being applied to the thermoplastic material are interrupted about midway in the extrusion operation and the material is relieved of stress temporarily after leaving the first frusto-conical section by flowing through said cylindrical annular passage before stress is again applied to the material in the next frusto-conical section.

8. A die body as described in claim 7 including means for adjusting the widths of the openings in the frusto-conical passage sections.

References Cited

UNITED STATES PATENTS

| | | | |
|---|---|---|---|
| 441,808 | 12/1890 | Royle et al. | |
| 2,199,209 | 4/1940 | Safford | 18—13 |
| 3,078,507 | 2/1963 | Park | 18—14 X |
| 3,147,515 | 9/1964 | Amsden | 18—14 |
| 3,245,111 | 4/1966 | Branscum | 18—14 X |

FOREIGN PATENTS

| | | |
|---|---|---|
| 222,872 | 8/1962 | Austria. |
| 343,300 | 9/1936 | Italy. |

WILLIAM J. STEPHENSON, *Primary Examiner.*